United States Patent [19]

Morrill

[11] 4,056,272
[45] Nov. 1, 1977

[54] SEAL

[76] Inventor: Charles Donovan Morrill, 5003 Holly, Bellaire, Tex. 77401

[21] Appl. No.: 611,860

[22] Filed: Sept. 10, 1975

Related U.S. Application Data

[63] Continuation-in-part of Ser. No. 447,141, March 1, 1974, abandoned.

[51] Int. Cl.[2] .............................................. F16L 21/00
[52] U.S. Cl. .................................... 285/140; 285/340; 285/348
[58] Field of Search ................................ 285/140–148, 285/340, 348, DIG. 18, DIG. 11, 139; 166/88, 89

[56] References Cited

U.S. PATENT DOCUMENTS

| | | | |
|---|---|---|---|
| 1,825,962 | 10/1931 | Laird | 285/340 X |
| 2,417,181 | 3/1947 | Sandilands | 285/148 |
| 2,992,840 | 7/1961 | Reynolds et al. | 285/340 X |
| 3,011,804 | 12/1961 | Burns | 285/143 X |
| 3,284,111 | 11/1966 | Pinkard | 285/141 |
| 3,305,315 | 2/1967 | Brown et al. | 166/.6 |
| 3,463,518 | 8/1969 | Broussard et al. | 285/340 |

Primary Examiner—Wayne L. Shedd

[57] ABSTRACT

An oil well pipe suspension apparatus including a wellhead having a pipe hanger supported therein and a christmas tree supported thereon, a frusto-conical metal gasket providing a metal-to-metal seal between the hanger and the wellhead, and an "X" cross section resilient metal gasket providing a metal-to-metal seal between the hanger and the christmas tree.

15 Claims, 14 Drawing Figures

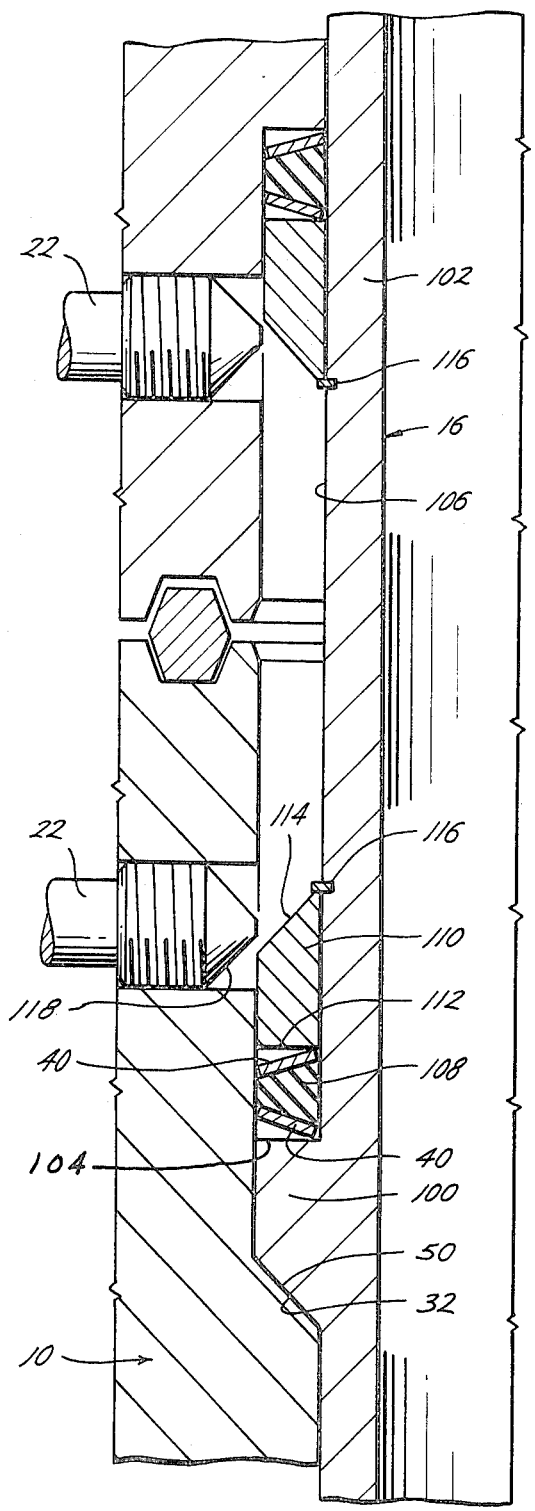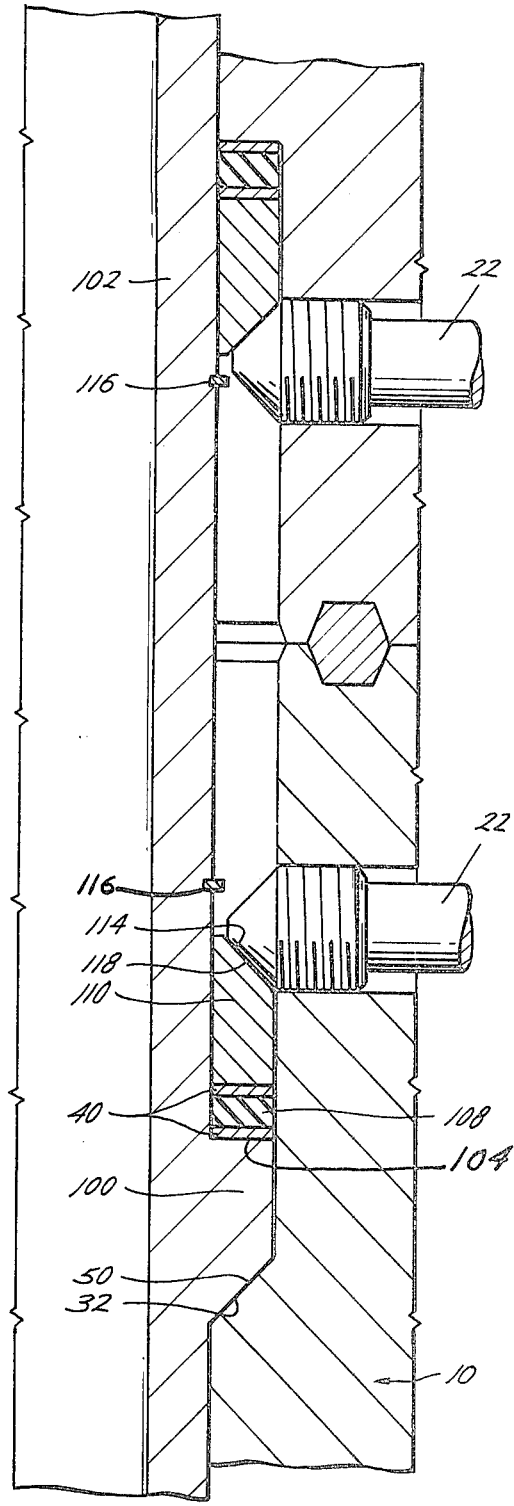

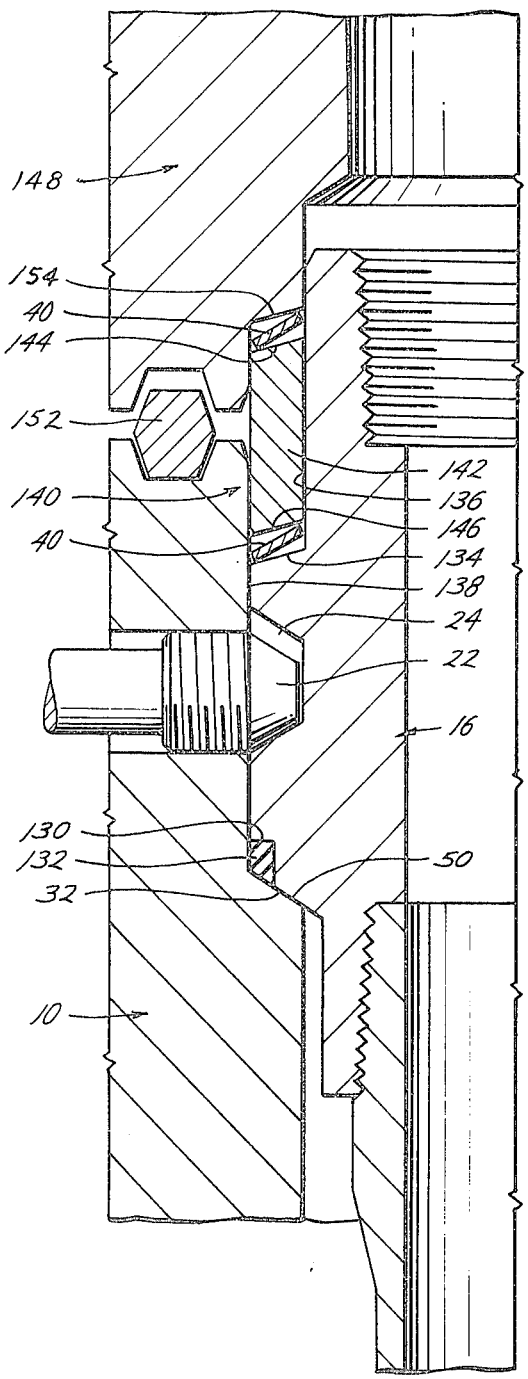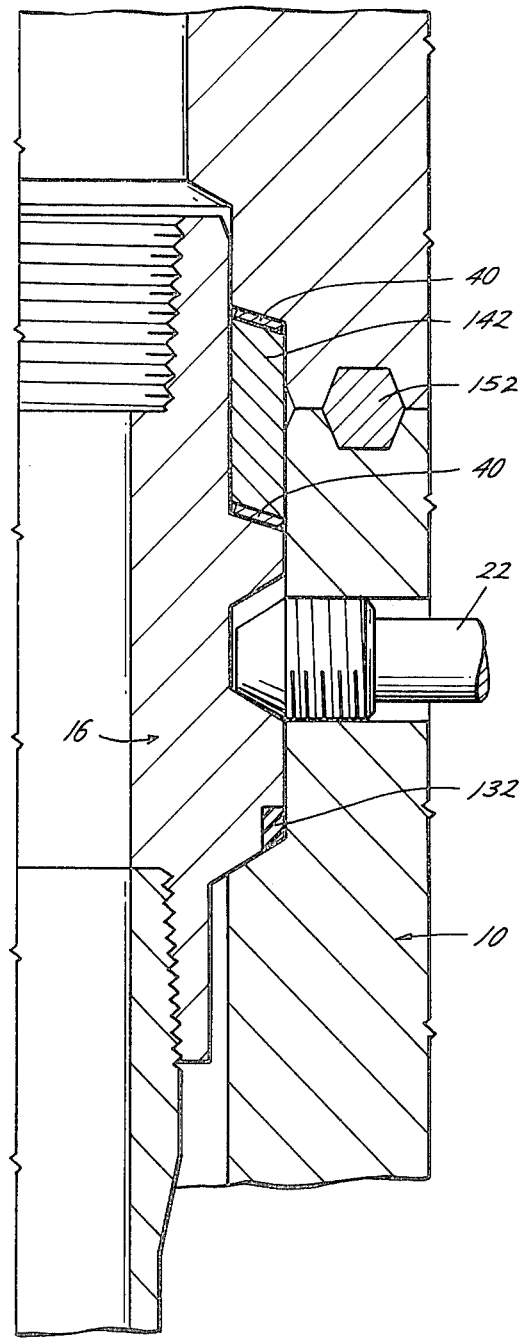

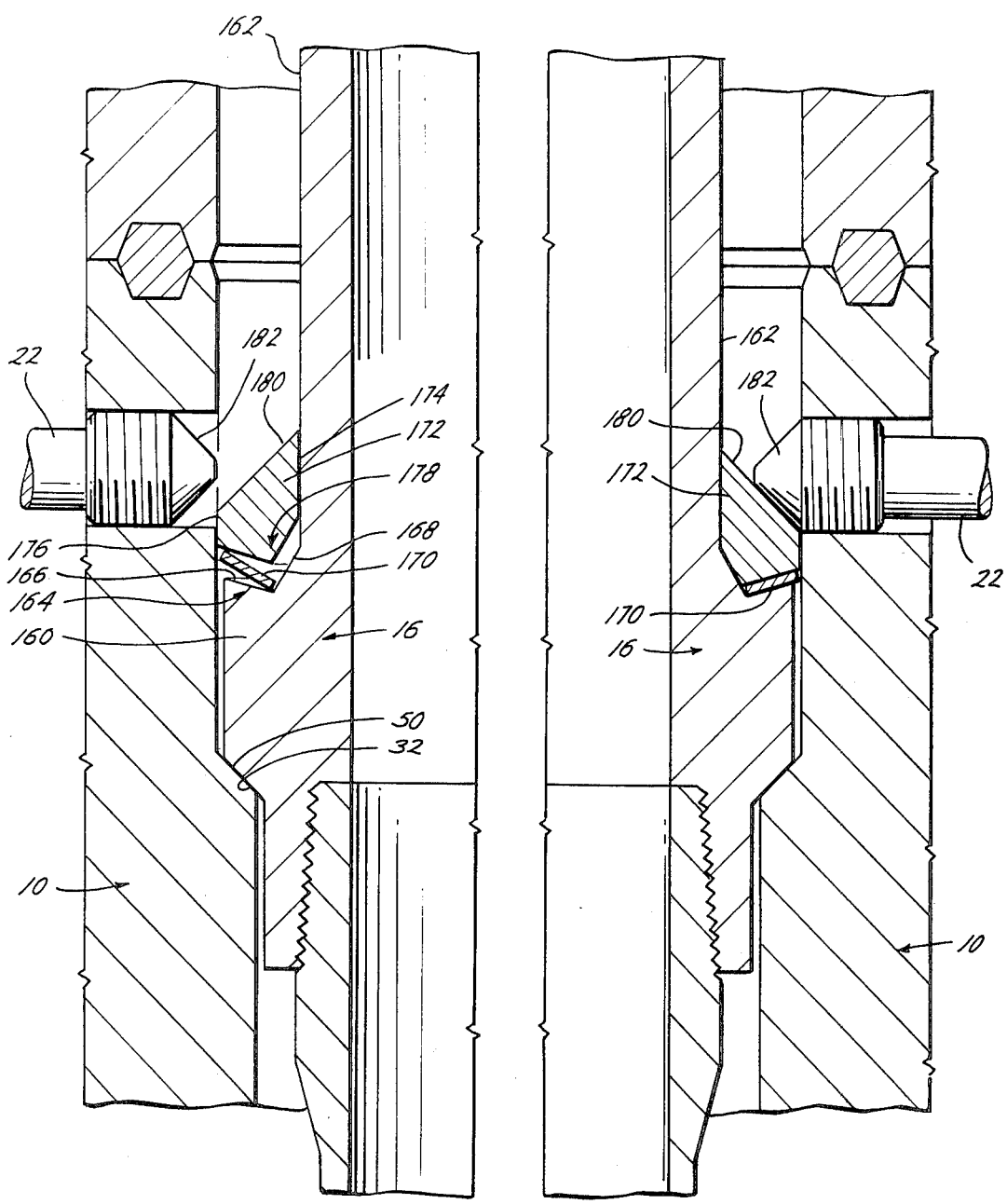

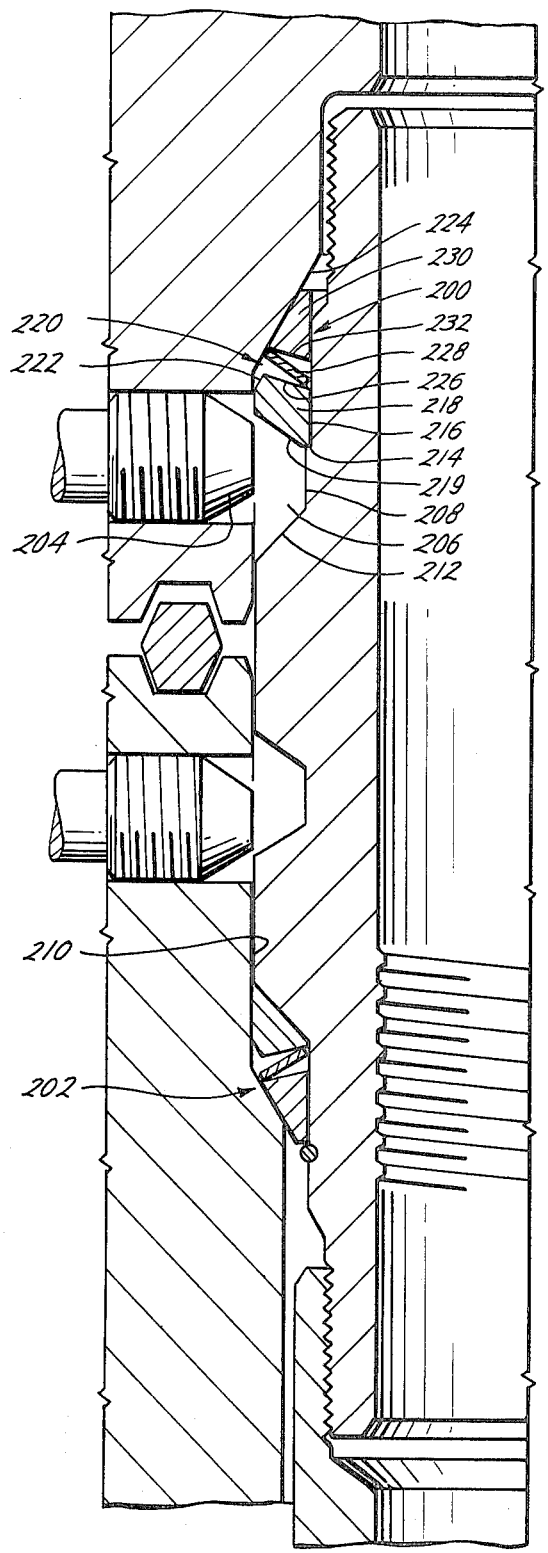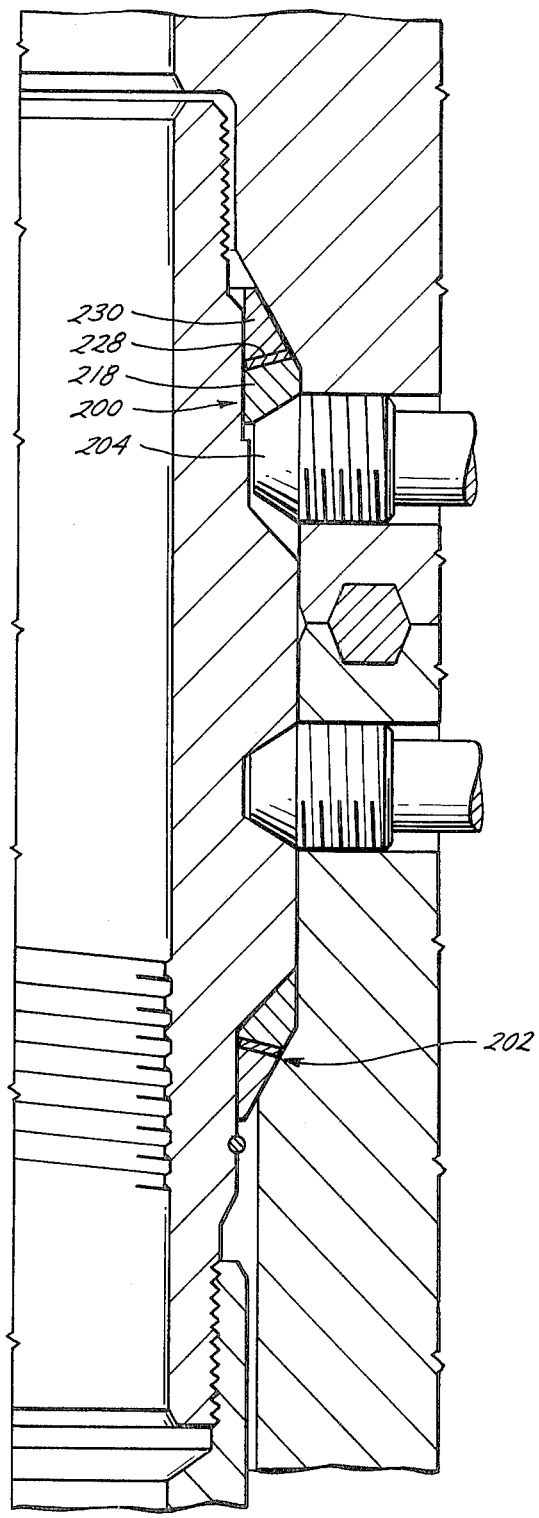

SEAL

REFERENCE TO RELATED APPLICATIONS

This application is a continuation-in-part of application Ser. No. 447,141, filed Mar. 1, 1974, now abandoned.

BACKGROUND OF THE INVENTION

1. Field of the Invention

This invention relates to seals and to well pipe suspension apparatus having novel sealing means.

2. Description of the Prior Art

Various means have heretofore been used to seal around pipe hangers in a wellhead as, for example, the O-rings and packing elements of elastomeric material as shown in U.S. Pat. No. 2,830,665 Burns et al. Recently, however, oil wells having bottom hole pressures of as high as 30,000 pounds per square inch have been encountered, and such seals as have previously been used have not been capable of holding such pressures.

Metal-to-metal seals of various kinds have also been used in many installations, including in wellheads. For example, the aforesaid patent to Burns et al shows the use of a metal ring gasket between two flanges of the christmas tree construction shown there.

One form of metal-to-metal gasket which has heretofore been known is that shown in U.S. Pat. No. 2,992,840 to Reynolds et al, which discloses a metal gasket which is frusto-conical in cross section and which is compressed between two flanges having a greater cone angle so that the gasket is deformed, the edges of the gasket being "coined" so as to closely engage elements of the flanges and provide a metal-to-metal seal.

Gaskets which apparently function similarly to those shown in the Reynolds et al patent are manufactured and sold by Aeroquip Corporation of Los Angeles, California under the trademarks CONOMASTER and CONOSEAL.

None of the aforesaid sealing systems has been capable of dependably providing a seal under pressures as high as 20,000 psi, much less 30,000 psi or higher. Furthermore, sealing systems such as that shown in the Reynolds et al patent are objectionable because the gaskets may work-harden and cause damage to sealing surfaces, and do not dependably seal against pressures from either direction, as required in pipe suspension apparatus, and because of difficulty in installing such a gasket in a well pipe suspension apparatus, where the gasket must be installed in an inaccessible location.

SUMMARY OF THE INVENTION

The present invention provides a gasket and sealing system which utilizes a metal-to-metal seal and is capable of being used at an inaccessible location, such as in a wellhead, and which will dependably provide a seal against pressures of 30,000 psi or higher, applied to either the top or the bottom of the gasket. Furthermore, the preferred embodiment of the gasket of this invention does not cause damage to other surfaces during installation or removal, or during actual sealing.

According to a preferred embodiment of this invention, sealing against high pressures is provided, as between a well pipe hanger and a wellhead, by means of an annular frusto-conical shaped metal gasket which fits between an inner cylindrical surface and an outer tapered surface, so that the lower edges of the inner and outer peripheries respectively sealingly engage these surfaces.

Other embodiments of the invention include using two annular frusto-conical metal gaskets oppositely disposed and separated by a deformable ring. These gaskets fit between an inner cylindrical pipe hanger surface and an outer cylindrical wellhead surface. By compressing the gaskets and ring between two parallel surfaces the gaskets are flattened and the ring is deformed. As the gaskets flatten, the inner and outer circumferences of the gaskets sealingly engage the pipe hanger and wellhead, respectively, forming an interference fit therewith.

Another embodiment includes two annular frusto-conical metal gaskets parallel disposed and separated by an annular spacer. These gaskets fit between an inner cylindrical pipe hanger surface an an outer cylindrical wellhead surface. As the gaskets are compressed between two parallel surfaces also parallel to the spacer, the gaskets are flattened and sealingly engage the wellhead and pipe hanger.

Another embodiment includes an annular frusto-conical shaped metal gasket that fits between an inner tapered pipe hanger surface and an outer cylindrical wellhead surface. By compressing the gasket between parallel surfaces, the gasket flattens so that its inner and outer edges sealingly engage the pipe hanger and wellhead, respectively.

In yet another embodiment of the invention the wellhead and pipe hanger are sealed at both an upper and a lower location by sealing means similar to the preferred embodiment. This enables sealing to prevent fluid or gas leaks either from the upper or lower portions of the pipe hanger.

BRIEF DESCRIPTION OF THE DRAWINGS

FIG. 5 is a vertical sectional view of a portion of a wellhead and tubing hanger showing another embodiment of the sealing apparatus;

FIG. 6 is a view similar to FIG. 5, but showing the sealing apparatus after compression of the gasket;

FIG. 7 is a vertical sectional view of a portion of a wellhead and tubing hanger showing another embodiment of the sealing apparatus;

FIG. 8 is a view similar to FIG. 7, but showing the sealing apparatus after compression of the gasket;

FIG. 9 is a vertical sectional view of a portion of a wellhead and tubing hanger showing another embodiment of the sealing apparatus;

FIG. 10 is a view similar to FIG. 9, but showing the sealing apparatus after compression of the gasket;

FIG. 11 is a vertical sectional view of a portion of a wellhead and tubing hanger showing another embodiment of the sealing apparatus;

FIG. 12 is a view similar to FIG. 11, but showing the sealing apparatus after compression of the gasket;

DESCRIPTION OF THE PREFERRED EMBODIMENTS

Figure 1:
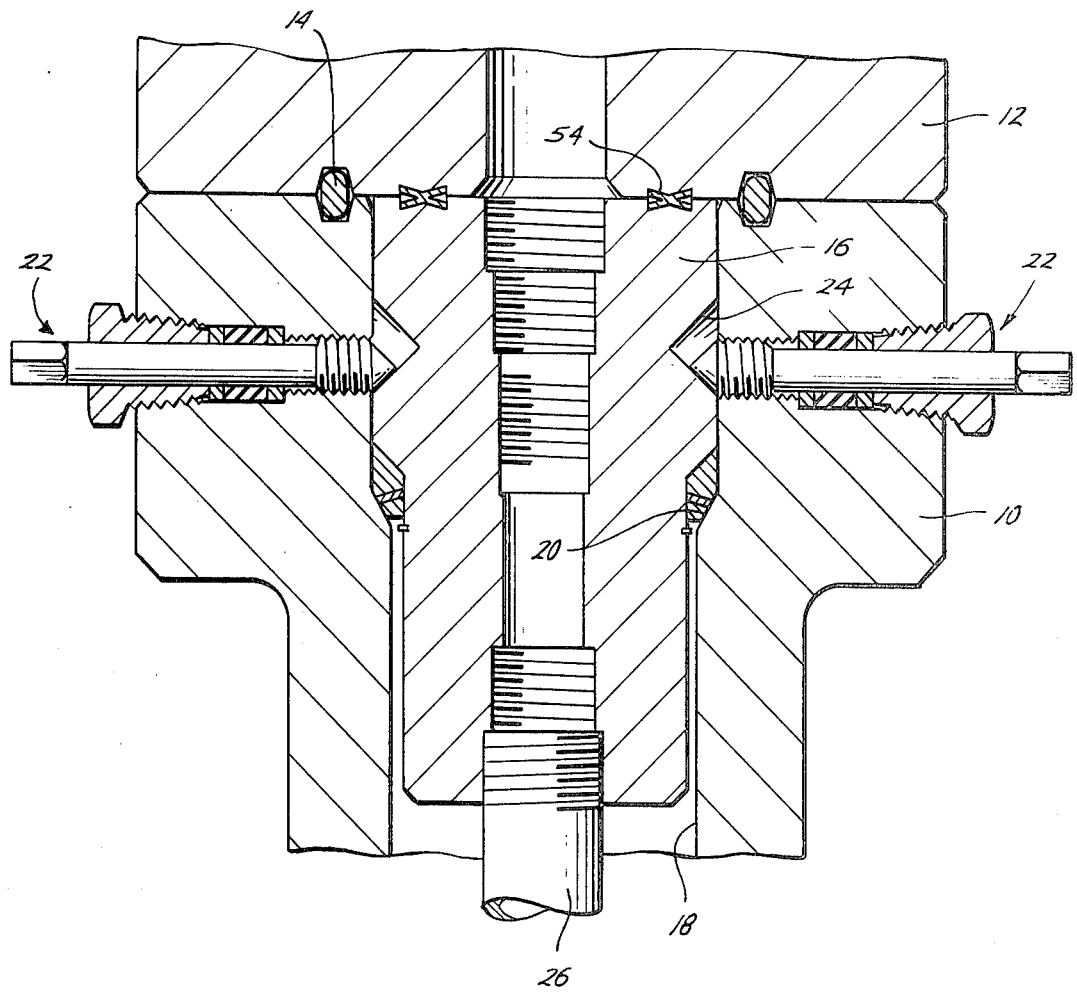
FIG. 1 is a vertical sectional view of a portion of a wellhead and christmas tree showing a pipe hanger and sealing apparatus according to one embodiment of this invention.

FIG. 1 of the drawing shows a wellhead 10 and the lower flange 12 of a christmas tree supported thereon, conventional ring gaskets 14 being used to provide a seal therebetween. A pipe hanger 16 is supported within the bore 18 of the wellhead on a tapered shoulder 20 thereof. The pipe hanger is held in place by means of conventional lockscrews 22 which fit into a recess 24 in the hanger. The pipe hanger supports a tubing string 26 as is well known in the art.

Figure 2:
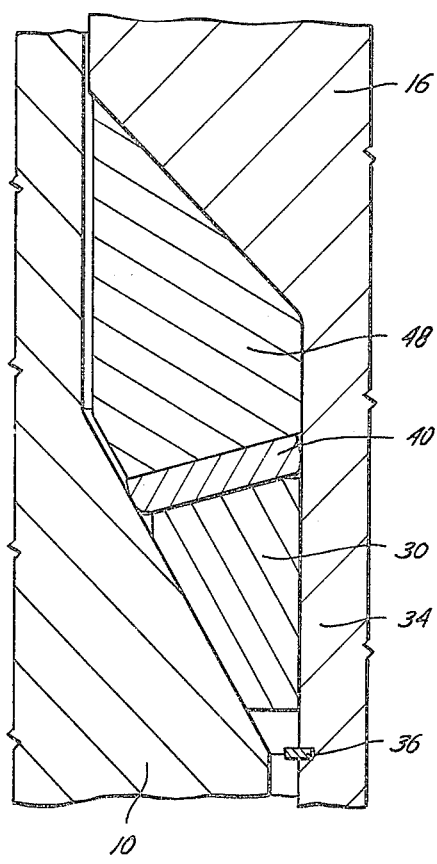
FIG. 2 is an enlarged fragmentary view showing the embodiment of sealing apparatus depicted in FIG. 1.
Figure 3:
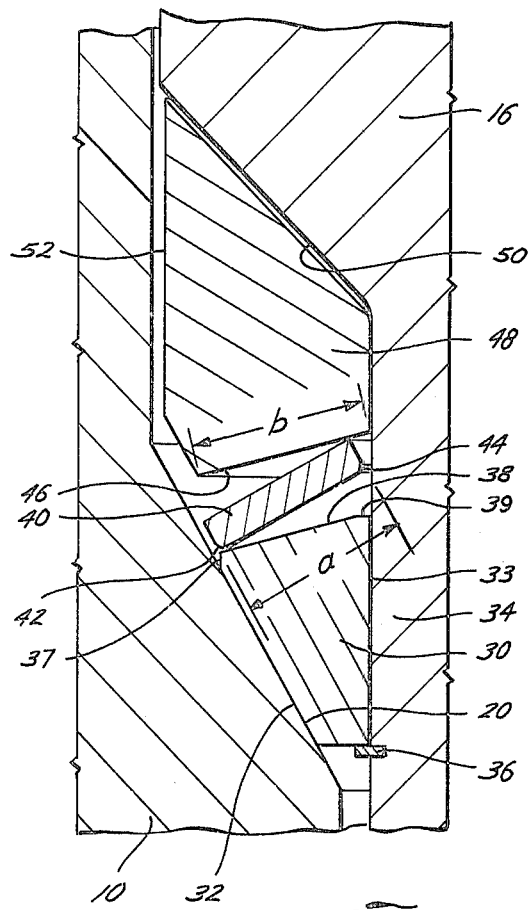
FIG. 3 is a view similar to FIG. 2, but showing the sealing apparatus before compression of the gasket.

FIGS. 2 and 3 of the drawing show in enlarged detail one embodiment of the sealing apparatus of this invention, FIG. 3 showing it in position when there is no load on the seal, and FIG. 2 showing it in position where the seal is fully loaded. Looking first at FIG. 3, a retainer ring 30, having an outer tapered circumferential surface 32 corresponding to the taper of the support shoulder 20 in the wellhead and an inner cylindrical surface 33 is carried on the lower cylindrical portion 34 of the pipe hanger by means of a conventional snap ring 36. The inner surface 33 has a close sliding fit on the cylindrical portion 34. The upper surface 38 of the retainer ring is frusto-conical at an angle which may, for example, be about 15° to the horizontal but which may also, in many installations, be substantially less or substantially more than this, i.e., from about 0° to about 45°. Preferably, this angle should be approximately half the angle of the taper 20 to the vertical, so that the angles between the upper surface 38 and the outer and inner surfaces 32 and 33 are substantially equal. The edges of the upper surface 38 are preferably beveled as shown at 37, 39, and the intersection between the cylindrical portion 34 and the taper 50 of the pipe hanger 16 is rounded to reduce stress concentration.

Resting upon the retainer ring 30 is a metal gasket 40 which surrounds the cylindrical portion 34, and, in this embodiment, the metal gasket is followed by a support ring 48. The gasket is frusto-conical in cross section, having a width substantially greater than its thickness. The lower corners of the gasket are rounded at 42 and 44 so as to eliminate the sharp corners. The cone of the gasket is in the same direction as the cone of the upper surface of the retainer ring, but has a smaller included cone angle. The differences in the cone angles may be from 10° to 40° or more, depending upon the particular materials and proportions of the elements. In one design which has been found to work satisfactorily the gasket is about ½ inch wide and about 0.1 inch thick, the upper frusto-conical surface 38 of the retainer ring is at approximately 15° to the horizontal (cone angle 150°) and the gasket surfaces are at about 30° to the horizontal (cone angle 120°). The radius of the rounded corners 42, 44 is preferably from about 0.02 inch to about 0.04 inch.

The upper edge of the inner periphery of the gasket bears against the lower frusto-conical surface 46 of the support ring 48 which, as does retainer ring 30, has a close sliding fit around the cylindrical portion 34 of the pipe hanger, and provides a supporting shoulder for the pipe hanger. The upper surface of the ring 48 is also frusto-conical, but in a direction opposite that of the surface 46, and bears against the corresponding frusto-conical surface 50 on the hanger. The outer circumference 52 of the support ring 48 fits comparatively loosely within the upper portion of the bore of the wellhead.

Figure 4:
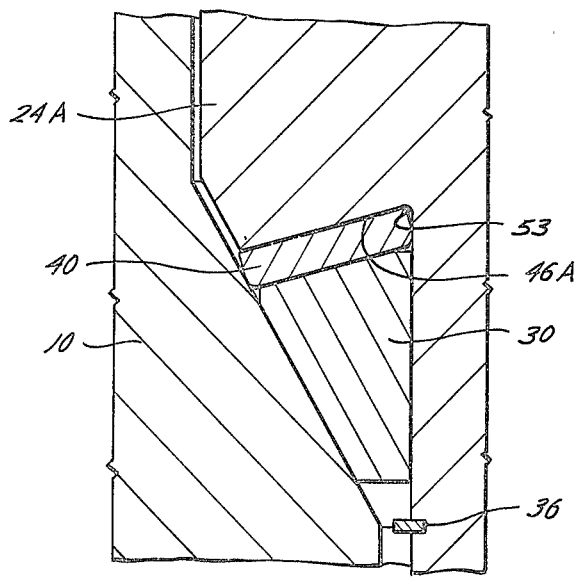
FIG. 4 is a view similar to FIG. 2 showing another embodiment of the invention.

The embodiment of the invention shown in FIG. 4 is substantially similar to that shown in the other Figures, except that the support ring 48 is made integral with the pipe hanger 24A to form a supporting shoulder 46A thereon. The other elements may be made substantially the same. This embodiment may be used in installations where there is less concern about stress concentrations at the corner 53.

It will be seen that going into the hole the rings 30 and 48 and the gasket 40 will be carried on the snap ring 36 until the retainer ring 30 engages the shoulder 20 of the wellhead. The weight of the pipe hanger and the tubing thereon will then begin to deform the gasket 40 causing it to assume the position shown in FIG. 2. The lockscrews 22 are then tightened into place to hold the hanger in position. As in the gasket design disclosed in the Reynolds et al patent, the retainer ring 30 and the support ring 48 engage opposed faces of the gasket to prevent it from buckling during deformation.

This deformation causes a decrease in the inside diameter of the gasket and an increase in the outside diameter. The annular width of the gasket 40 is such that when it is compressed between the surfaces 38 and 46, as shown in FIG. 2, the outer circumference moves radially outwardly and the inner circumference moves radially inwardly until the rounded corners 42 and 44 have an interference fit with the tapered shoulder 20 of the wellhead and the cylindrical portion of the pipe hanger, respectively, so that sealing is effected on both sides of the gasket. The annular width a of the gasket must, therefore, be greater than the width of the upper surface 38 of the retainer ring 30, and to be sure that a good seal is obtained, the gasket must be wide enough for at least about one-half of the thickness of the edge to interfere with both the wellhead and the hanger. Preferably the gasket substantially entirely fills the space between the retainer ring and the support ring, and to accomplish this the annular width a of the gasket may be as wide as the lower surface 46 of the support ring 48, as shown at b.

It is apparent that in order for such interference to occur, the gasket is made of a material which is softer than the materials of the wellhead and the hanger, so that the inner and outer edges are deformed, or "coined," to conform to the surfaces engaged by the gasket. Thus the gasket conforms to small irregularities in these surfaces, insuring a sealing fit.

The inner and outer edges of the gasket are preferably substantially perpendicular to the top and bottom surfaces, in order that interference and coining of the edges will result in the gasket substantially filling the space between the retaining ring and the support ring.

Since the gasket has an outside diameter which is substantially smaller than the upper bore of the wellhead there is no chance that the surface of the gasket can be damaged by scraping on the bore of the wellhead as it is installed, the first contact of the gasket with the bore being at substantially the point at which the final seal is to be accomplished.

Furthermore, if it becomes necessary to remove the pipe hanger, as soon as an upward force is applied to the hanger to remove it, this force is applied in such a direction as to tend to rotate the gasket back to its initial cone angle, so that the gasket is readily removable, and will not scrape on the wellhead while being removed. Since the compression of the gasket between the surfaces 38 and 46 normally stresses the gasket beyond its yield strength, the gasket will not resume its original shape.

The gasket is substantially rigid, being formed of a material such as copper, copper alloys, aluminum, stainless steel or steel, which is softer than the material of the surfaces against which it seals. Sometimes the seal is made from the same material, but annealed to make it softer, so that it will not damage the other surfaces.

Stainless steels have been found to have suitable characteristics for the gaskets of this invention. However, stainless steel tends to work-harden, so that it could become harder than the surfaces against which it seals and the interference fitting of the gasket between these surfaces could cause damage to the surfaces. This is avoided, according to a preferred embodiment of the present invention, by the aforesaid rounding off of the lower corners of the edges of the gasket and by "coining" into the tapered wellhead shoulder. Coining into a tapered shoulder that tapers away from the gasket reduces stresses and assists in a smoother interference fit. This also reduces the damage to the wellhead surface.

The "X" cross section gasket 54 provides a seal between the upper end of the pipe hanger and the lower flange of the christmas tree 12. This gasket functions similarly as the gasket 40, in that the legs of the "X" are deformed as the load is applied to it and sealing is accomplished by an interference fit between the outer and inner ends of the legs and the surrounding edges of the groove in which the gasket is retained. Such gaskets are manufactured and sold by the Aeroquip Corporation of Los Angeles, California. Other forms of gaskets, such as a gasket similar to the gasket 40, may be used in place of the gasket 54.

FIGS. 5–14 show further embodiments of the invention. The description of the gasket design parameters hereinbefore applies to these embodiments and no further explanation will be made. These embodiments utilize the same type of sealing principle as discussed relative to FIGS. 2–4 but constitute different types of seals for use with a tubing hanger suspended within a wellhead.

FIGS. 5 and 6 show in enlarged detail another embodiment of the sealing apparatus of this invention. FIG. 5 shows the sealing apparatus when there is no load on the seal, and FIG. 6 shows the sealing apparatus when the seal is fully loaded. Looking first at FIG. 5, pipe hanger 16 has a flange portion 100 that has a lower tapered support shoulder 50 and an upper shoulder 104 that is substantially perpendicular to the pipe hanger axis. Support shoulder 50 rests on opposing support shoulder 32 of wellhead 10.

Above flange shoulder 104 is cylindrical portion 106 of pipe hanger 16. Cylindrical portion 106 has a smaller outside diameter than flange 100. Resting on shoulder 104 and surrounding cylindrical portion 106 are frusto-conical metal gaskets 40. Gaskets 40 are oppositely disposed to each other with a deformable ring 108 therebetween. Ring 108 may be made of Teflon, polyurethane, rubber, or any other suitable material, and its initial cross-section is generally triangular.

Bearing against the upper gasket 40 is compression ring 110. Compression ring 110 slidingly engages cylindrical portion 106 of pipe hanger 16 and has an outer diameter substantially equal to that of flange portion 100. Compression ring 110 has a lower surface 112 which is parallel to and oppositely disposed to shoulder 104 of flange portion 100 so that gaskets 40 and ring 108 are sandwiched therebetween. Compression ring 110 is initially held in place by snap-ring 116. The upper surface 114 of compression ring 110 is frusto-conical so that it may be engaged by lock-screws 22 having a corresponding frusto-conical surface 118.

This type of sealing apparatus may be used at the top of the tubing hanger also as shown generally at 102 and may be energized from either the top or the bottom by lockscrews 22. Deformable ring 108 acts as a backup seal for the two metal gaskets 40 to fill any scratches or machine marks in the wellhead 10 or on the cylindrical portion 106 of pipe hanger 16. Metal gaskets 40 flatten against deformable ring 108 causing it to compress into a rectangular shape and seal against the walls of the wellhead 10 and pipe hanger 16.

In operation the pipe hanger 16 carrying gaskets 40, deformable ring 108, and compression ring 110 is inserted into wellhead 10. Pipe hanger 16 will rest on wellhead 10 when its support shoulder 50 engages wellhead support shoulder 32. To form the seal between the pipe hanger 16 and wellhead 10, lockscrew 22 is tightened. As lockscrew 22 is tightened, it forces the compression ring 110 downward. As compression ring 110 moves downward it presses gaskets 40 together thus deforming ring 108. Upon further tightening of lockscrew 22, gaskets 40 will "coin" into an interference fit with cylindrical portion 106 of pipe hanger 16 at the inner circumferential edge and with wellhead 10 at the outer circumferential edge. Deformable ring 108 will deform to fill the space between the gaskets 40 and the wellhead 10 and pipe hanger 16 as shown in FIG. 6.

Referring now to FIGS. 7 and 8 there is shown another embodiment of the sealing apparatus of this invention. FIG. 7 shows the sealing apparatus when there is no load on the seal, and FIG. 8 shows the sealing apparatus when the seal is fully loaded. Looking first at FIG. 7, tubing hanger 16 has tapered support shoulder 50 opposing tapered support shoulder 32 of wellhead 10. The outside corner of wellhead support shoulder 50 is notched at 130 to receive seal ring 132. Seal ring 132 may be formed of an elastomer such as Teflon, nylon, rubber, or any suitable sealing material. Above seal ring 132 is lockscrew 22 in recessed portion 24. Lockscrew 22 tightens to compress seal ring 132 into sealing engagement with wellhead 10 and pipe hanger 16.

Located above lockscrew 22 is pipe hanger shoulder 134. Frusto-conical metallic gasket 40 is carried by shoulder 134. Resting on gasket 40 is metallic spacer ring 142. Spacer ring 142 is rhomboid in cross-section having cylindrical surfaces slidingly engaging pipe hanger 16 at cylindrical portion 136 and wellhead 10 and frusto-conical upper and lower edges 144 and 146, respectively. Frusto-conical edges 144 and 146 are parallel and also parallel to pipe hanger shoulder 134. Resting on spacer ring 142 is another frusto-conical metallic gasket 40.

An upper wellhead or valve member 148 is attached by bolts (not shown) to wellhead 10. A Bx gasket 152 is placed in groove 154 between upper wellhead member 148 and wellhead 10 to seal therebetween. Upper wellhead member 148 has a tapered shoulder 154 parallel to pipe hanger shoulder 134 and bearing on upper gasket 40.

In operation pipe hanger 16 carrying seal ring 132 is inserted into wellhead 10. When pipe hanger support shoulder 50 engages wellhead support shoulder 32, seal ring 132 will be compressed into groove 130. Tightening of lockscrew 22 results in seal ring 132 sealingly engaging wellhead 10. After pipe hanger 16 has been inserted and tightened, Bx gasket 152 is placed in groove 154, and upper wellhead member 148 is placed on wellhead 10. Upon tightening upper wellhead 148 to wellhead 10 gaskets 40 will be compressed so that they conform to ring 142. As gaskets 40 are compressed their inner and outer circumferential edges "coin" so as to interferingly fit with pipe hanger 16 and wellhead 10 or 148, respectively.

This type of tubing hanger seal is designed to protect Bx gasket 152 from high pressure gas coming from either above or below. Seal ring 132 is only a temporary seal ring, and thus need not form a metal-to-metal seal. When the upper wellhead member 148 is fastened to wellhead 10, gaskets 40 will seal between both the pipe hanger 16 and wellhead 10 and the pipe hanger 16 and upper wellhead member 148. Thus, Bx gasket 152 will be bridged by upper and lower gaskets 40. It will be noted that since gaskets 40 and ring 142 are all metal, strict tolerances must be maintained to insure a proper seal.

Referring now to FIGS. 9 and 10, there is shown another embodiment of the invention. FIG. 9 shows the sealing apparatus when there is no load on the seal, and FIG. 10 shows the sealing apparatus when the seal is fully loaded. Looking first at FIG. 9, pipe hanger 16 has tapered support shoulder 50 opposing tapered support shoulder 32 of wellhead 10. Pipe hanger 16 has a flange portion 160 slidingly engaging wellhead 10. Above flange portion 160 is a cylindrical portion 162 having a smaller outer diameter than flange portion 160. Flange portion 160 has an upper V-shaped shoulder 164. The V-shaped shoulder 164, as shown, has a surface 166 tapering upwardly toward wellhead 10 and a surface 168 tapering downwardly. A frusto-conical metal gasket 170 rests on V-shaped shoulder 164. In its unstressed mode, gasket 170 has a cone angle less than the angle of upwardly tapering surface 166 so that gasket 170 only rests on surface 166 at its inner circumferential edge. Above gasket 170 is retainer ring 172. Retainer ring 172 has cylindrical surfaces 174, 176 slidingly engaging pipe hanger 16 and wellhead 10, respectively. Retainer ring 172 has a lower V-shaped surface 178 corresponding to V-shaped pipe hanger shoulder 164 and an upper tapered surface 180. Upper tapered surface 180 is tapered so as to correspond to tapered surface 182 of lockscrew 22.

In operation, pipe hanger 16 carrying gasket 170 and retainer ring 172 is lowered into wellhead 10. When the opposing support shoulders 50 and 32 have engaged, the lockscrew 22 is tightened. The tightening of lockscrew 22 urges retainer ring 172 against gasket 170. As gasket 170 is compressed its circumferential edges "coin" into an interference fit with the downwardly tapering pipe hanger shoulder 168 and wellhead 10.

Referring now to FIGS. 11 and 12, there is shown another embodiment of the invention. FIG. 11 shows the sealing apparatus when there is no load on the seal, and FIG. 12 shows the sealing apparatus when the seal is fully loaded. This embodiment is similar to that of FIGS. 2 and 3 with the addition of an upper seal means 200 above the lower seal means 202 as shown in FIGS. 2 and 3. Looking first at FIG. 11, lockscrew 204 is inserted through wellhead 10 and into recessed area 206. Recessed portion 206 is formed where the pipe hanger 16 has two step-down regions in which the outer diameter decreases. Cylindrical portion 208 steps down from cylindrical portion 210 which portion slidingly engages the wellhead 10. Tapered shoulder 212 provides this first stepdown transition. The second stepdown is provided by shoulder 214. Shoulder 214 connects cylindrical portion 208 with smaller diameter cylindrical portion 216.

Upper seal means 200 includes upper and lower annular rings 230, 218, respectively, and frusto-conical metal gasket 228. Support ring 218 slidingly engages pipe hanger cylindrical portion 216 and rests on shoulder 214. Support ring 218 has a frusto-conical lower surface 219 to correspond to lockscrew 204 and a V-shaped upper surface 220. The V-shaped upper surface 220 is beveled at 222 to correspond to tapered wellhead shoulder 224 and is beveled at 226 to provide a downwardly tapering surface. Frusto-conical gasket 228 rests on support ring surface 226. A retainer ring 230 is disposed above gasket 228 and is shaped to wedge between pipe hanger cylindrical portion 216 and wellhead shoulder 224. Retainer ring 230 has a frusto-conical lower surface 232 corresponding to beveled surface 226 of lower retainer ring 218.

In operation, the pipe hanger 16 is lowered into wellhead 10 and the lower seal means 202 is compressed between pipe hanger shoulder 50 and wellhead shoulder 32. Lockscrew 22 is then tightened to insure that the lower seal means is tight. Then upper lockscrew 204 is tightened thus compressing the upper seal means 200 against wellhead shoulder 224 and pipe hanger cylindrical portion 216. As it is compressed gasket 228 "coins" into an interference fit with pipe hanger cylindrical portion 216 and wellhead shoulder 224, thus providing a seal against pressure from above the tubing hanger 16.

Figure 13:
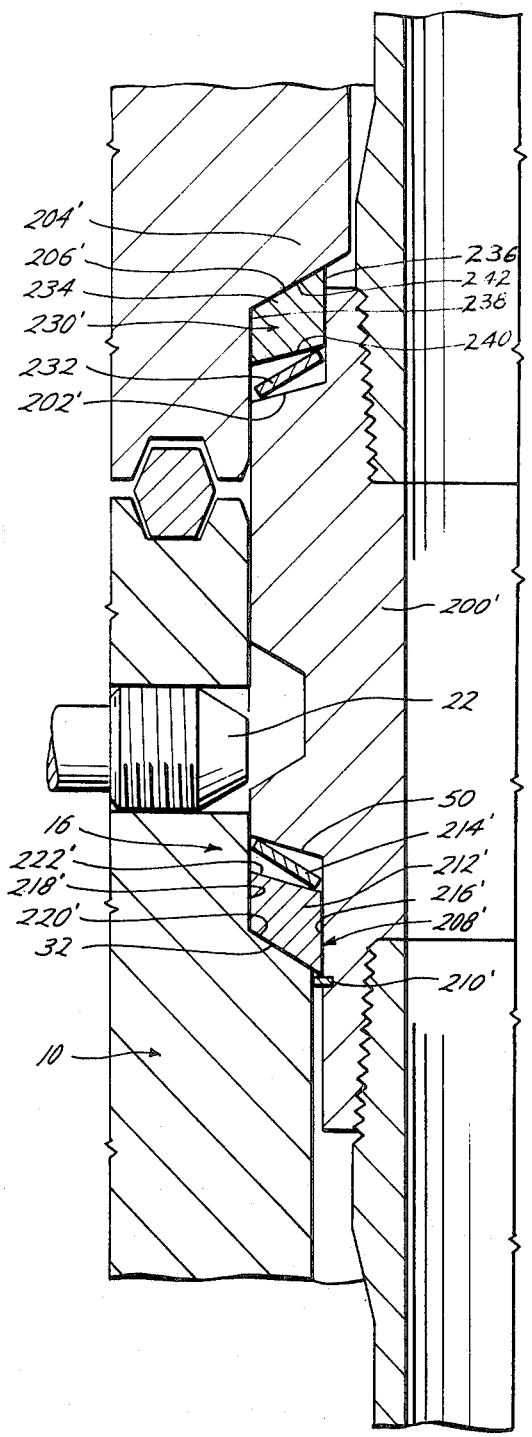
FIG. 13 is a vertical sectional view of a portion of a wellhead and tubing hanger showing another embodiment of the sealing apparatus.
Figure 14:
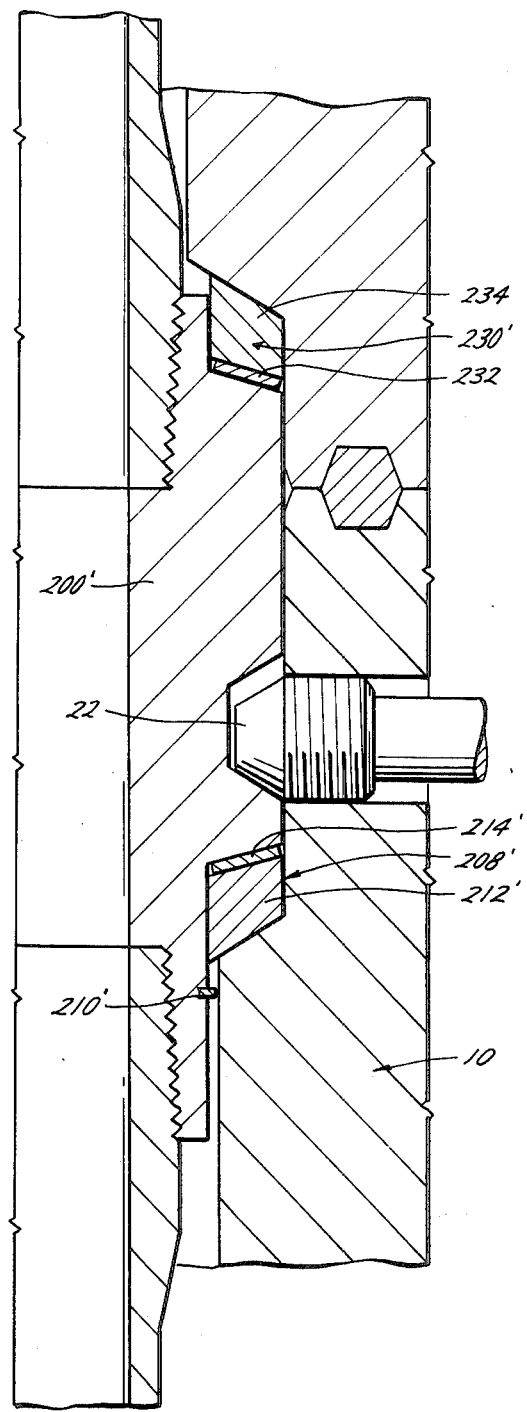
FIG. 14 is a view similar to FIG. 13, but showing the sealing apparatus after compression of the gasket.

Referring now to FIGS. 13 and 14 there is shown another embodiment of the invention. FIG. 13 shows the sealing apparatus when there is no load on the seal, and FIG. 14 shows the sealing apparatus when the seal is fully loaded. Referring now to FIG. 13, pipe hanger 16 has tapered annular support shoulder 50 opposing tapered annular support shoulder 32 of wellhead 10. Pipe hanger 16 has a flange portion 200' slidingly engaging wellhead 10. Flange portion 200' has support shoulder 50 on its lower portion and another support shoulder 202' on its upper portion. Wellhead 10 has an upper wellhead portion 204' that has a support shoulder 206' opposing flange shoulder 202'.

Lower seal means 208' is carried on snap-ring 210' on pipe hanger 16 below shoulder 50. Lower seal means 208' includes retainer ring 212' and a metal annular frusto-conical gasket 214'. Retainer ring 212' has cylindrical surfaces 216', 218' slidingly engaging pipe hanger 16 and wellhead 10, respectively. Retainer ring 212' also has a lowered frusto-conical surface 220' corresponding to wellhead shoulder 32 and an upper frusto-conical surface 222' corresponding to pipe hanger shoulder 50. Metal gasket 214' is carried on retainer ring 212' between ring 212' and pipe hanger shoulder 50.

An upper seal means 230' is carried on pipe hanger flange shoulder 202'. Upper seal means 230' includes a metal annular frusto-conical gasket 232 carried by shoulder 202' and a support ring 234 resting on gasket 232. Support ring 234 has cylindrical surfaces 236, 238 slidingly engaging pipe hanger 16 and upper wellhead portion 204', respectively, and it also has lower frusto-conical surface 240 corresponding to flange shoulder 202' and upper frusto-conical surface 242 corresponding to upper wellhead shoulder 206'.

In operation, pipe hanger 16 carrying lower seal means 208' on snap-ring 210' and upper seal means 230' on flange shoulder 202' is lowered into wellhead 10. When retainer ring shoulder 220' engages wellhead shoulder 32, gasket 214' will be compressed between retainer ring 212' and pipe hanger shoulder 50. As gasket 214' compresses it flattens so that its inner and outer circumferential edges "coin" against the pipe hanger 16 and wellhead 10, respectively. Final sealing engagement is effected upon tightening of lockscrew 22.

After lockscrew 22 has been tightened, upper wellhead portion 204' is placed on wellhead 10. When this happens, upper wellhead portion shoulder 206' will engage support ring 234 and compress gasket 232 against flange shoulder 202'. As gasket 232 compresses, it flattens so that its inner and outer circumferential edges "coin" against the pipe hanger 16 and upper wellhead portion 204', respectively. Final sealing engagement is effected upon tightening of bolts (not shown) which fasten upper wellhead portion 204' to wellhead 10 as shown in FIG. 14.

In FIGS. 13 and 14 the pipe hanger shoulders, wellhead shoulders, and gaskets are all shown tapering outwardly and toward lockscrew 22. The gaskets will also seal effectively if the taper is outwardly and away from lockscrew 22. This type of sealing means having an upper and a lower seal means is designed to seal the interface between upper wellhead portion 204' and wellhead 10. Upper seal means 230' seals against pressure from above pipe hanger 16 and lower seal means 208' against pressure from below pipe hanger 16.

Many variations of this invention will be apparent to those skilled in the art from the embodiments and modifications hereinbefore described. The invention is therefore not to be considered to be limited to the described embodiments, but to all forms of the invention which may come within the scope of the appended claims.

I claim:
1. Well pipe suspension apparatus comprising:
a wellhead,
a well pipe,
pipe hanger means carried within said wellhead for supporting said well pipe,
opposing tapered annular support shoulders on said pipe hanger means and said wellhead supporting said pipe hanger means in said wellhead,
said support shoulders being separated forming an annular space,
an annular metal gasket in said annular space between said support shoulders,
said gasket having inner and outer circumferential edges,
one edge of said gasket sealingly engaging one of said tapered support shoulders of said pipe hanger means and said wellhead, and
the other edge sealingly engaging the other of said pipe hanger means and said wellhead.

2. Well pipe suspension apparatus as defined by claim 1
wherein said inner and outer circumferential edges of said gasket have an interference fit with said pipe hanger means and said wellhead, respectively.

3. Well pipe suspension apparatus as defined by claim 2
wherein said gasket is made of a metal which is softer than either said pipe hanger means or said wellhead, so that said edges are deformed to conform to irregularities in the engaging surfaces of said pipe hanger means and wellhead.

4. Well pipe suspension apparatus as defined by claim 1
wherein said gasket is frusto-conical in configuration, and is retained on its upper and lower surfaces between frusto-conical surfaces.

5. Well pipe suspension apparatus as defined by claim 4
wherein said gasket is in stress, having an unstressed cone angle less than the cone angle of said frusto-conical surfaces.

6. Well pipe suspension apparatus as defined by claim 5 wherein said gasket is compressed by said pipe hanger means between said frusto-conical surfaces beyond its yield point.

7. Well pipe suspension apparatus as defined by claim 5 wherein said gasket in its unstressed condition has a larger inner diameter and a smaller outer diameter than said pipe hanger means and said wellhead, respectively, at the point of engagement by said gasket.

8. Well pipe suspension apparatus as defined by claim 7 wherein the lower corners of the inner and outer peripheries of said gasket in its unstressed condition are rounded.

9. Well pipe suspension apparatus as defined by claim 1, and including
an annular retainer ring between the lower surface of said gasket and said support shoulder of said wellhead.

10. Well pipe suspension apparatus as defined by claim 9 wherein said pipe hanger has a cylindrical portion below its support shoulder, and said retainer ring is slidably mounted on said cylindrical portion.

11. Well pipe suspension apparatus as defined by claim 10 wherein said pipe hanger support comprises an annular ring around said pipe hanger above and immediately adjacent said gasket.

12. Well pipe suspension apparatus, comprising:
a wellhead having a bore with a tapered annular support shoulder in the bore,
a pipe hanger in said bore having a substantially cylindrical portion,
an annular frusto-conical supporting shoulder on said pipe hanger positioned above said wellhead shoulder, and above said cylindrical portion,
an annular retainer ring slidably mounted on said cylindrical portion having an outer tapered surface corresponding with and resting upon a lower portion of said tapered support shoulder, and an upper frusto-conical surface tapering in the same direction and at substantially the same angle as said pipe hanger supporting shoulder, and
an annular metal gasket having an inner and outer periphery positioned between said frusto-conical surface and said pipe hanger supporting shoulder, said gasket tapering in the same direction as said surface and said supporting shoulder but having a smaller cone angle, whereby when there is no load on the gasket, one periphery of said gasket bears against said pipe hanger supporting shoulder and said other periphery bears against said retainer ring frusto-conical surface,
the lower edges of the peripheries of said gasket being rounded, and said gasket having a width sufficient that said inner and outer peripheries respectively interferingly engage said cylindrical portion of said pipe hanger and said tapered support shoulder of said wellhead when said pipe hanger is lowered into said wellhead with sufficient load that said gasket is deformed to the same cone angle as said frusto-conical surface and said pipe hanger supporting shoulder.

13. Well pipe suspension apparatus, comprising:
a wellhead,
pipe hanger means carried within said wellhead,
said pipe hanger means having a flange portion having first and second support shoulders,
a support shoulder on said wellhead opposing said flange portion first support shoulder,
an annular gasket sealing means carried by said flange portion second support shoulder,
said gasket sealing means sealingly engaging said pipe hanger means and said wellhead,
said flange support second shoulder having a downwardly tapering portion and an upwardly tapering portion,
said gasket sealing means including a frusto-conical metal gasket having inner and outer circumferential edges and a retainer ring, one edge of said gasket sealingly engaging one of said one of said tapering portions and said wellhead and the other edge sealingly engaging the other of said one of said tapering portions and said wellhead.

14. Well pipe suspension apparatus as defined by claim 13 and including
urging means for urging said gasket sealing means into sealing engagement with said one of said tapering portions and said wellhead,
said gasket being other than perpendicular to said wellhead.

15. In joint structure comprising
a first member having a main bore, a concentric smaller bore and an annular shoulder between the bores,
a second member telescopically received in said bores of the first member and having a main diameter, a reduced diameter and an annular shoulder facing and spaced away from the first member shoulder,
cooperative annular sealing surfaces in said main bore and on said reduced diameter, and
an annular, resilient, frusto-conical gasket between said shoulders with its outer periphery engageable by the shoulder of the first member and its inner periphery engageable by the shoulder of the second member,
the inner and outer diameters of said gasket being such that when the shoulders are moved toward each other to compress the gasket the inner and outer diameters move into sealing engagement with said sealing surfaces,
the improvement wherein one of said sealing surfaces is tapered.

* * * * *

UNITED STATES PATENT AND TRADEMARK OFFICE
CERTIFICATE OF CORRECTION

PATENT NO. : 4,056,272
DATED : November 1, 1977
INVENTOR(S) : Charles Donovan Morrill It is certified that error appears in the above-identified patent and that said Letters Patent are hereby corrected as shown below:

In the Drawing, Figure 7: Add line 154' leading to the groove into which is placed Bx gasket 152 and which is between upper wellhead member 148 and wellhead 10.

Column 6, line 59: After "groove", delete "154" and insert -- 154' --.

Column 7, line 3: After "groove", delete "154" and insert -- 154' --.

On the title page: After item "[76]", insert as a separate and complete item -- Assignee: McEvoy Oilfield Equipment Co., Houston, Texas --.

Column 2, line 17: After "surface", delete "an" and insert -- and --.

Signed and Sealed this

Eighth Day of August 1978

[SEAL]

Attest:

RUTH C. MASON
Attesting Officer

DONALD W. BANNER
Commissioner of Patents and Trademarks